US009317386B2

(12) United States Patent
Chang et al.

(10) Patent No.: US 9,317,386 B2
(45) Date of Patent: Apr. 19, 2016

(54) EVENT PROCESSING METHOD AND APPARATUS PERFORMING THE SAME

(71) Applicant: LG CNS CO., LTD., Seoul (KR)

(72) Inventors: Yoo Jin Chang, Seoul (KR); Tae-Chang Jee, Seoul (KR); Si Hwan Kim, Seoul (KR); JaeMan Kim, Seoul (KR); HyunPyo Kim, Seoul (KR); SangWoo Lee, Seoul (KR); Sang Yoon Lee, Seoul (KR); SeenTae Lee, Seoul (KR)

(73) Assignee: LG CNS CO., LTD., Seoul (KR)

( * ) Notice: Subject to any disclaimer, the term of this patent is extended or adjusted under 35 U.S.C. 154(b) by 70 days.

(21) Appl. No.: 14/081,994

(22) Filed: Nov. 15, 2013

(65) Prior Publication Data

US 2014/0143793 A1    May 22, 2014

(30) Foreign Application Priority Data

Nov. 20, 2012    (KR) .......................... 10-2012-0131517

(51) Int. Cl.
G06Q 10/00 (2012.01)
G06F 11/30 (2006.01)
G06F 9/54 (2006.01)
G06F 17/30 (2006.01)

(52) U.S. Cl.
CPC ............... *G06F 11/30* (2013.01); *G06F 9/542* (2013.01); *G06F 17/30516* (2013.01); *G06F 17/30551* (2013.01); *G06Q 10/00* (2013.01)

(58) Field of Classification Search
CPC .................... G06F 17/30516; G06F 17/30551; G06F 11/30; G06F 9/542; G06Q 10/00
See application file for complete search history.

(56) References Cited

U.S. PATENT DOCUMENTS

| 2009/0125550 | A1* | 5/2009 | Barga et al. ................. 707/104.1 |
| 2011/0093490 | A1* | 4/2011 | Schindlauer ....... G06F 17/30929 707/769 |
| 2011/0252132 | A1* | 10/2011 | Wetzer .................... G06F 9/542 709/224 |
| 2013/0049967 | A1* | 2/2013 | Lee .............................. 340/585 |
| 2013/0103210 | A1* | 4/2013 | Brey et al. ..................... 700/282 |
| 2013/0186888 | A1* | 7/2013 | Connors ....................... 219/756 |
| 2013/0346390 | A1* | 12/2013 | Jerzak ............... G06F 17/30103 707/719 |
| 2014/0052729 | A1* | 2/2014 | Macho et al. .................. 707/738 |
| 2014/0277795 | A1* | 9/2014 | Matsuoka et al. ............ 700/291 |
| 2014/0317287 | A1* | 10/2014 | Ziekow ......................... 709/224 |
| 2015/0000889 | A1* | 1/2015 | Bellamkonda et al. ....... 165/287 |
| 2015/0040144 | A1* | 2/2015 | Mineno ............. G06F 17/30979 719/318 |
| 2015/0143145 | A1* | 5/2015 | Nakamikawa ........ G06F 1/3231 713/320 |

FOREIGN PATENT DOCUMENTS

KR    10-0496944    6/2005

* cited by examiner

Primary Examiner — Charles E Anya
(74) Attorney, Agent, or Firm — Lee Hong Degerman Kang & Waimey; Jonathan Kang; Jeffrey Lotspeich

(57) ABSTRACT

An event processing method includes receiving an event from an event source and identifying an event population and non-event population based on the received event, such that the event population includes a plurality of events and the non-event population includes a plurality of non-events. The method further includes identifying an event feedback group from the events of the identified event population, such that the event feedback group identifies a number of events of the identified event population that have performed a required operation, and determining a ratio of event feedback, the ratio of the event feedback being a ratio of the number of events identified by the event feedback group to a number of the events of the identified event population.

18 Claims, 7 Drawing Sheets

300

| ID | GENERATION TIME | WHETHER THE EVENT SOURCE DATA CORRESPONDS TO THE EVENT | WHETHER REQUIRED STEP IS PERFORMED |
|---|---|---|---|
| 10001 | 2012.09.18 00:00 | O | O |
| 10002 | 2012.09.18 00:02 | O | X |
| 10003 | 2012.09.18 00:04 | X | O |
| 10004 | 2012.09.18 00:06 | X | X |
| 10005 | 2012.09.18 00:08 | O | O |
| 10006 | 2012.09.18 00:10 | X | O |
| 10007 | 2012.09.18 00:12 | O | X |
| ⋮ | ⋮ | ⋮ | ⋮ |

FIG. 3

EVENT PROCESSING METHOD AND APPARATUS PERFORMING THE SAME

CROSS-REFERENCE TO RELATED APPLICATIONS

Pursuant to 35 U.S.C. §119(a), this application claims the benefit of earlier filing date and right of priority to Korean Patent Application No. 10-2012-0131517, filed on Nov. 20, 2012, the contents of which are hereby incorporated by reference herein in their entirety.

FIELD OF THE INVENTION

The present invention relates to an event processing technique, and more particularly, to an event processing method and apparatus that detects an event from an event source, analyzes a ratio of the detected event and an event feedback group performing a specific action as a required step by a user to evaluate event definition suitability and determine a new meaningful event definition.

DISCUSSION OF THE RELATED ART

A conventional event processing apparatus may extract specific data as an event from a large amount of data to use the extracted event. Herein, CEP (Complex Event Processing) refers to a technique that is used to extract a predefined event from complex structured data. A BEP (Business Event Processing) technique is used to extract a predefined event to use the predefined data as a business event.

Herein, various event extraction techniques are disclosed.

Korean Patent Registration No. 10-1075550 relates to an image sensing agent and a security system of a USN complex type, and more particularly, a system that includes a monitoring camera, a sensor node, a data transmitter and a vision recognition server system part. The monitoring camera, which is installed in the event created region, outputs the video signal to a data transmitter. The sensor node includes a plurality of the sensors installed at the event created region, outputs a sensing signal sensed with constant form of the temperature value, the humidity value, the pressure value etc. The data transmitter encodes the analog image signal transmitted from a monitoring camera and an analog detection signal transmitted from the sensor node and converts into the digital signal, and transmits to a vision recognition server system part. After the vision recognition server system part receives the video data and sensor data transmitted from data transmitter, the video data is provided to monitor with real-time.

Korean Patent Registration No. 10-0881273 relates to a sensor node of a cordless sensor network, and more particularly, to a first sensor node module for generating and processing, when it is activated, a first sensing signal to detect occurrence of an event based on the first sensing signal; and a second sensor node module for generating and processing a second sensing signal, when it is activated, to monitor state transition of the event based on the second sensing signal. Further, when the occurrence of the event is detected, the first sensor node module is inactivated and the second sensor node module is activated.

The prior art disclose techniques for detecting an predefined event among data generating a target system. That is, known techniques focus on decreasing an error generation ratio when the event is detected but do not recognize capable problems generated after an event extraction procedure.

More particularly, a user monitoring an event generation about a system may perform a required step (for example, a predetermined specific action) after determining whether the event is meaningful. Even if the event is extracted by an event extractor (for example, the CEP engine), the user does not perform the required step when a predefined event is not meaningful. That is, predefining meaningful data as an event corresponds to a more significant subject better than a procedure extracting the event. The user applies a work environment rapidly varied to newly define necessary data as event but this subject is not disclosed.

SUMMARY

There are some cases where a specific action is not performed in spite of an event extraction and a specific action is performed without an event extraction. Such cases may mean that the predetermined event is not suitably defined. Such cases may implement techniques for determining whether data are already defined as an event by analyzing the event extracted from an event source and an event where a required step or operation is performed among the extracted event and determining whether the event is newly defined.

Presented herein are techniques that propose the event processing method and apparatus analyzing a ratio of a detected event and an event feedback group performing a specific action as a required step by a user to verify a suitability of an event definition and determine a new meaningful event definition.

Presented herein are techniques that propose the event processing method and apparatus comparing, with a first threshold, a ratio of an event population associated with an detected event and an event feedback group performing a specific action as the required step to determine whether the event definition is meaningful and determine a new event definition.

Presented herein are techniques that propose the event processing method and apparatus comparing, with a second threshold, a ratio of an non-event population associated with data not corresponding to an event and an event claim group performing a specific action by a user as the required step to determine whether the event definition is meaningful and determine a new event definition.

In some embodiments, an event processing method is performed on an event processing apparatus. The event processing method may include detecting an event from an event source, respectively determining an event population and a non-event population according to whether the detected event exists and extracting an event group population (hereinafter, also referred to as an event feedback group) associated with a required step from the determined event to determine a ratio of an event feedback.

In one embodiment, the event population may correspond to a group of the detected event, the non-event population may correspond to a group being not associated with the detected event and being disjoint from the event population and the event feedback group may correspond to an event group associated with a required step, the required step corresponding to a specific action predetermined by a user.

In one embodiment, the event processing method may further include checking whether the ratio of the event feedback exceeds the predetermined first threshold.

In one embodiment, the event processing method may further include correcting the event determination parameter determining a boundary between the event population and the non-event population when the ratio of the event feedback does not exceed the first threshold.

In one embodiment, the event determination parameter may include a parameter defined by the event source.

In one embodiment, the event processing method may further include extracting the event group (hereinafter, also referred to as an event claim group) associated with the required action from the determined the non-event population to determine the ratio of the event claim.

In one embodiment, the event processing method may further include checking whether the ratio of the event claim is less than the predetermined second threshold.

In one embodiment, the event processing method may further include correcting the event determination parameter determining the boundary between the event population and the non-event population when the ratio of the event feedback does not exceed the first threshold and the ratio of the event claim is not less than the second threshold.

In one embodiment, correcting the event determination parameter may further include adding a new parameter in the event determination parameter to correct the event determination parameter when an event determination parameter where the ratio of the event feedback exceeds the first threshold and the ratio of the event claim is less than the second threshold does not exist.

In one embodiment, the new parameter may include a parameter defined by another event source different from the event source.

In some embodiments, an event processing apparatus performs on an event processing method. The event processing apparatus may include an event detection unit detecting an event from an event source, an event analysis unit respectively determining an event population and non-event population and a correction performing unit extracting an event group (hereinafter, also referred to as an event feedback group) associated with a required step from the determined event population to determine a ratio of an event feedback.

In one embodiment, the event population may correspond to a group of the detected event, the non-event population may correspond to a group being not associated with the detected event and being disjoint from the event population and the event feedback group may correspond to an event group associated with a required step, the required step corresponding to a specific action predetermined by a user.

In one embodiment, the correction performing unit may check whether the ratio of the event feedback exceeds a predetermined first threshold.

In one embodiment, the correction performing unit may correct an event determination parameter determining a boundary between the event population and the non-event population when the ratio of the event feedback does not exceed the first threshold.

In one embodiment, the event determination parameter may include a parameter defined by the event source.

In one embodiment, the correction performing unit may extract the event group (hereinafter, also referred to as an event claim group) associated with the required step from the determined non-event population to determine a ratio of an event claim.

In one embodiment, the correction performing unit may check whether the ratio event claim is less than a predetermined second threshold.

In one embodiment, the correction performing unit may correct the event determination parameter determining a boundary between the event population and the non-event population when the ratio of the event feedback does not exceed the first threshold or the ratio of the event claim is not less than the second threshold.

In one embodiment, the correction performing unit may add a new parameter to the event determination parameter to correct the event determination parameter when an event determination parameter causing the ratio of the event feedback to exceed the first threshold and the ratio of the event claim to be less than the second threshold does not exist.

In one embodiment, the new parameter may include a parameter defined by another event source and other than the event source.

The event processing method and related techniques according to an example embodiment may analyze a ratio of the detected event and the event feedback group performing the specific action as required step by a user to evaluate the suitability and to determine a definition of new event.

The event processing method and related techniques according to an example embodiment may compare, with a first threshold, a ratio of the event population associated with a detected event and the event feedback group performing the specific action as the required step by a user to determine whether the definition of the event is meaningful and to determine the definition of new event.

The event processing method and related techniques according to an example embodiment may compare, with the second threshold, a ratio of the non-event population associated with data not corresponding to the event and the event claim group performing the specific action as the required step by the user to determine whether new definition needs and determine the new definition.

That is, the present invention may disclose techniques extracting data performing the required step (also referred to herein as required operation) as the event, if necessary.

BRIEF DESCRIPTION OF THE DRAWINGS

FIG. 3 is a table depicting an event population and non-event population.

DETAILED DESCRIPTION

Figure 1:
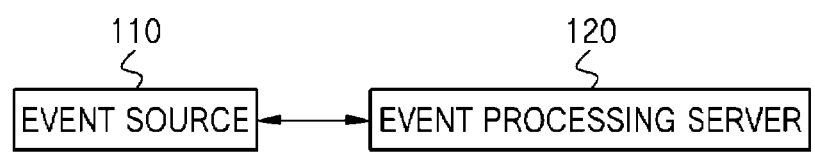
FIG. 1 is a diagram illustrating an event processing system according to an embodiment of the present invention.

Explanation of the present invention is merely an embodiment for structural or functional explanation, so the scope of the present invention should not be construed to be limited to the embodiments explained in the embodiment. That is, since the embodiments may be implemented in several forms without departing from the characteristics thereof, it should also be understood that the embodiments presented herein are not limited by any of the details of the foregoing description, unless otherwise specified, but rather should be construed broadly within its scope as defined in the appended claims.

Therefore, various changes and modifications that fall within the scope of the claims, or equivalents of such scope are therefore intended to be embraced by the appended claims.

Terms described in the present disclosure may be understood as follows.

While terms such as "first" and "second," etc., may be used to describe various components, such components must not be understood as being limited to the above terms. The above terms are used only to distinguish one component from another. For example, a first component may be referred to as a second component without departing from the scope of rights of the present disclosure, and likewise a second component may be referred to as a first component.

It will be understood that when an element is referred to as being "connected to" another element, it can be directly connected to the other element or intervening elements may also be present. In contrast, when an element is referred to as being "directly connected to" another element, no intervening elements are present. In addition, unless explicitly described to the contrary, the word "comprise" and variations such as "comprises" or "comprising," will be understood to imply the inclusion of stated elements but not the exclusion of any other elements. Meanwhile, other expressions describing relationships between components such as "~between", "immediately~between" or "adjacent to~" and "directly adjacent to~"may be construed similarly.

Singular forms "a", "an" and "the" in the present disclosure are intended to include the plural forms as well, unless the context clearly indicates otherwise. It will be further understood that terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Identification letters (e.g., a, b, c, etc.) in respective steps are used for the sake of explanation and do not described order of respective steps. The respective steps may be changed from a mentioned order unless specifically mentioned in context. Namely, respective steps may be performed in the same order as described, may be substantially simultaneously performed, or may be performed in reverse order.

In describing the elements of the present disclosure, terms such as first, second, A, B, (a), (b), etc., may be used. Such terms are used for merely discriminating the corresponding elements from other elements and the corresponding elements are not limited in their essence, sequence, or precedence by the terms.

In the foregoing exemplary system, the methods are described based on the flow chart as sequential steps or blocks, but the present disclosure is not limited to the order of the steps and some of them may be performed in order different from the order of the foregoing steps or simultaneously. Also, a skilled person in the art will understand that the steps are not exclusive but may include other steps, or one or more steps of the flow chart may be deleted without affecting the scope of the present invention.

The terms used in the present application are merely used to describe particular embodiments, and are not intended to limit the present disclosure. Unless otherwise defined, all terms used herein, including technical or scientific terms, have the same meanings as those generally understood by those with ordinary knowledge in the field of art to which the present invention belongs. Such terms as those defined in a generally used dictionary are to be interpreted to have the meanings equal to the contextual meanings in the relevant field of art, and are not to be interpreted to have ideal or excessively formal meanings unless clearly defined in the present application.

FIG. 1 is a diagram illustrating an event processing system according to an embodiment of the present invention.

Referring to FIG. 1, the event processing system 100 includes an event source 110 and an event processing apparatus 120. The event source 110 may be an apparatus generating specific data (hereinafter, also referred to as event source data) from a monitoring target system. More particularly, the event source 110 may be an apparatus generating data associated with at least one condition being detected from the monitoring target system. For example, the event source 110 may include a temperature sensor installed on the inside of a refrigerator when the monitoring target system is a refrigerator. The temperature sensor may generate data corresponding to a temperature of the inside the refrigerator, with such data being the event source data.

As another example, the event source 110 may be implemented using one or more of a CPU monitoring device, a process monitoring device, or a network monitoring device when the monitoring target system is a personnel computer. The event source 110 may generate data corresponding to at least one of a CPU usage, a CPU temperature, a process input-output quantity, or a network usage as the event source data.

The event source 110 may be predetermined by a monitoring user and may transmit event source data generated by the event source 110 to the event processing apparatus 120. That is, the event source 110 may generate data corresponding to a population in an event extraction.

The event processing apparatus 120 may include a computing device performing an event processing procedure and be connected to the event source 110 through a network. The event processing apparatus 120 may receive the event source data 110 through the network from the event source 110.

In one embodiment, the event processing apparatus 120 may receive the event source data from the event source 110 at specified time periods, which may be predetermined An example of the event processing apparatus 120 will be described with reference to FIG. 2.

Figure 2:
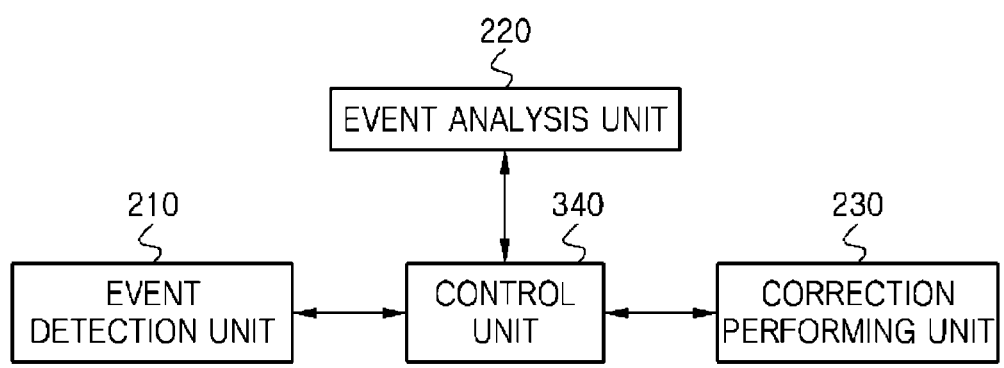
FIG. 2 is a block diagram illustrating an event processing apparatus of FIG. 1.

FIG. 2 is a block diagram illustrating an event processing apparatus of FIG. 1.

Referring to FIG. 2, the event processing apparatus 120 includes an event detection unit 210, an event analysis unit 220, a correction performing unit 230 and a control unit 240.

The event detection unit 210 detects an event from the event source 110. More particularly, the event detection unit 210 detects a predetermined event among event source data received from the event source 110. Hereinafter, these embodiments are illustrated for convenience's sake and these embodiments should not be intended to limit the scope of the present disclosure.

As one example, the event detection unit 210 may detect data corresponding to temperature that exceeds a threshold (e.g., greater than 100 degrees) among event source data received from the event source 110 as the event. This example may occur when the event source 110 is a temperature sensor installed on the inside of a refrigerator and an event is defined as data exceeding a threshold (e.g., the temperature is greater than 100 degrees).

As another example, the event detection unit 210 may extract data corresponding to temperature and humidity thresholds (e.g., the temperature is greater than 100 degrees and the humidity is greater than 80%) among event source data received from the event source 110 as the event. The example may occur when the event source 110 includes a temperature sensor and a humidity sensor installed on the inside of a refrigerator and an event is defined as the noted temperature and humidity thresholds.

In one embodiment, the event detection unit 210 may associate an event source data identifier and an event generation time to store the event in an event detection storage when the event is detected. The event detection storage may include a database that stores a plurality of event source data identifiers and the event generation time. For example, the event detection unit 210 may generate data such as: ({10001, 2012.09.18.00:00}, {10002, 2012.09.18.00:02}, . . . ) to store the event in the event detection storage.

In another embodiment, the event detection unit 210 may associate an event source data identifier, a received time, and whether the event source data corresponds to the event, to store the event in the event detection storage. This event detection storage may include a database storing a plurality of event source data identifiers, a received time, and whether the event source data correspond to the event. For example, the event detection unit 210 may generate data such as: ({10001, 2012.09.18.00:00, event}, {10002, 2012.09.18.00:02, event}, {10003, 2012.09.18.00:04, non_event}, . . . ) to store the event in the event detection storage.

That is, the event detection unit 210 may process an event detected in the event detection storage based on an predetermined associative relation to store the event, if necessary.

In one embodiment, the event may be defined through an event determination parameter. Such an event determination parameter may include a parameter defined by the event source 110. More particularly, the event may be defined through a parameter defined by the event source 110 and a standard parameter. For example, the event source 110 may include a temperature sensor and a humidity sensor when the event is defined as the temperature and humidity each exceed a threshold, such as those previously mentioned, and the event may be defined as a parameter (temperature, humidity) defined by the event source 110 and a corresponding standard parameter (100,80). As such, the event may be implemented as data corresponding to (t, 100, h, 80). That is, the event determination parameter may be the factor necessary for defining the event and may correspond to {t}, {100}, {h} and {80}.

In one embodiment, the event detection unit 210 may use an event detector to detect the event. For example, the event detector may include a CEP (Complex Event Processing) engine.

The event analysis unit 220 determines an event population and a non-event population according to whether a detected event exists. More particularly, the event analysis unit 220 determines the event population associated with an event detected by the event detection unit 210 and determines the non-event population being not associated with the event detected by the event detection unit 210 and being disjoint from the event population.

In one embodiment, the event analysis unit 220 may access the event detection storage to determine the event population and the non-event population. The event detection storage may include a database storing the event source data generation time and data as to whether the event source data corresponds to the event.

In another embodiment, the event analysis unit 220 may access a separate storage different from the event detection storage storing the event detected by the event detection unit 210 to determine the event population and the non-event population. Such separate storage may include a database storing the event with the event source data generation time and data as to whether the event source data corresponds to the event.

The event population and the non-event population will be described with reference to FIG. 3.

FIG. 3 is a table depicting an event population and non-event population. More specifically, FIG. 3 illustrates a table with event detection information that can be stored in the event detection storage when the event detection unit 210 stores the event source data received from the event source 110 with the event source data generation time and data as to whether the event source data corresponds to the event. These embodiments should not be intended to limit the scope of the present disclosure. That is, the event analysis unit 220 may access the database storing the necessary data in order to perform an event processing procedure to analyze the data.

First, the event analysis unit 220 determines the event population associated with the event detected by the event detection unit 210. In one embodiment, the event population may correspond to the event detected by the event detection unit 210 among the event source data. Alternatively, the event population may include the number of the events detected by the event detection unit 210 among the event source data.

For example, the event analysis unit 220 may determine data (ID 10001, 10002, 10005, 10007, . . . ) determined as the event by the event detection unit 210 from the event source data received at two minute interval as the event population. As another example, the event analysis unit 220 may determine the number of data (ID 10001, 10002, 10005, 10007, . . . ) determined as the event by the event detection unit 210 as the event population.

Then, the event analysis unit 220 determines the non-event population as being not associated with the detected event and being disjoint from the event population.

In one embodiment, the non-event population may correspond to the event source data being not detected as the event by the event detection unit 210 among the event source data. Alternatively, the non-event population may include the number of the event source data being not detected as the event by the event detection unit 210 among the event source data.

For example, the event analysis unit 220 may determine the event source data (ID 10003, 10004, 10006, . . . ) as being not detected as the event by the event detection unit 210 from the event source data received at two minute intervals as the non-event population. As another example, the event analysis unit 220 may determine the number of the event source data (ID 10003, 10004, 10006, . . . ) as being not detected as the event by the event detection unit 210 as the non-event population.

That is, the event population may be associated with the event detected by the event detection unit 210 and the non-event population may be associated with the event source data being not detected as the event by the event detection unit 210. In some situations, the event population and the non-event population may not mutually include the same data and may have a disjoint relation.

In one embodiment, the event analysis unit 220 may determine the event population and the non-event population based on the event source data received during a predetermined specific time period. If desired, the specific time period may be determined by a user. For example, the event analysis unit 220 may target the event source data during a twenty four time period from 00:00, Sep. 18, 2012 to determine the event detected by the event detection unit 210 as the event population.

In one embodiment, the event analysis unit 220 may determine the event population and the non-event population from the event detection storage and the event detection storage stores the event source data identifier with data indicating whether the event source data corresponds to the event.

In FIG. 2, the correction performing unit 230 extracts an event group (hereinafter, also referred to as an event feedback group) associated with a required operation from the event population to determine a ratio of an event feedback.

This required operation may be a specific action predetermined by a user. For example, the user may cause the correction performing unit 230 to perform a specific action corresponding to the operating of a cooling unit as being a required operation for the corresponding event when specific event source data are detected as the event and are transmitted to a terminal associated with the user. As another example, the user may cause the correction performing unit 230 to perform a specific action corresponding to operation of a cooling unit as a required operation for the corresponding event source data when the specific event source data is not detected as the event. That is, the required operation may represent a predetermined specific action suitable for performing monitoring of the event source 110.

Figure 4:
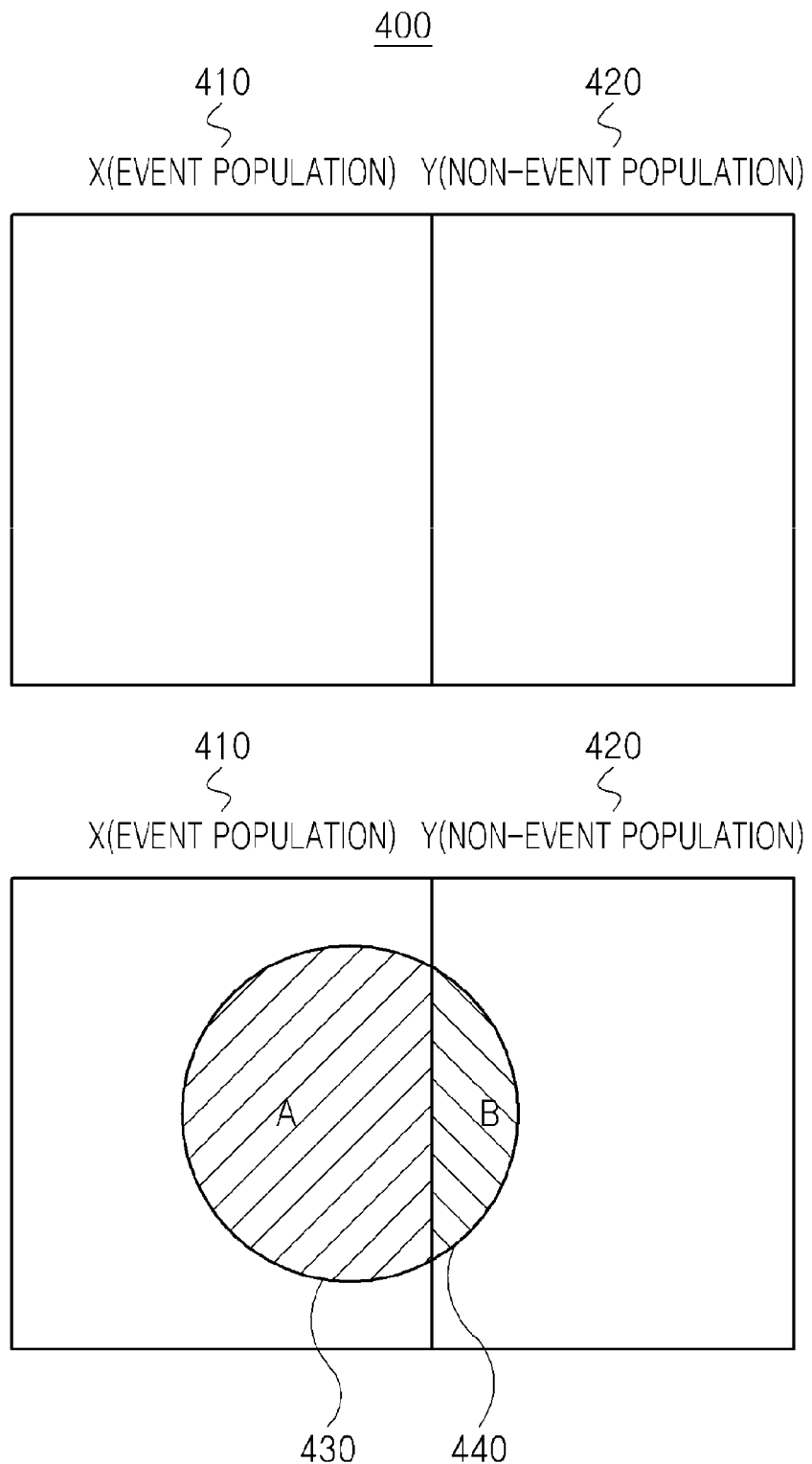
FIG. 4 is a diagram illustrating a ratio of event feedback and an event claim.

Reference is now made to FIG. 4 to describe the correction performing unit 230 extracting the event feedback group among the event population to determine the ratio of the event feedback.

FIG. 4 is a diagram illustrating a ratio of event feedback and an event claim. Specifically, FIG. 4 illustrates an embodiment of a schematized diagram of the event population 410, the non-event population 420, the event feedback group 430 and the event claim group 440. These embodiments are illustrated for convenience's sake and these embodiments should not be intended to limit the scope of the present disclosure.

The event analysis unit 220 determines the event population 410 and the non-event population 420. Herein, the correction performing unit 230 extracts (e.g., receives) the event feedback group 430 in the event population 410. More particularly, the event feedback group 430 corresponds to an event performing the required operation by the user among the event population 410 associated with an event detected by the event detection unit 210. That is, the correction performing unit 230 extracts the event feedback group 430 associated with the required operation from the event population 410.

In one embodiment, the correction performing unit 230 may extract the event feedback group 430 from the event processing storage. The event processing storage may include a database storing the event source data identifier, and data indicating whether the event source data corresponds to the event and whether the required operation is performed.

In one embodiment, the event processing storage may be implemented as a database substantially the same as the event detection storage. That is, the event processing storage and the event detection storage may be implemented as a single database to store the event with a plurality of the event source data identifiers, received times, data indicating whether the event source data corresponds to the event and whether the required operation is performed. In one embodiment, whether the required operation is performed may be input by a user of the event processing server 120.

In one embodiment, the correction performing unit 230 may access the event processing storage to query and receive necessary data necessary for performing the event processing procedure according to an embodiment of the present invention when the event processing storage and the event detection storage is implemented as a separate database.

In another embodiment, the event detection unit 210, the event analysis unit 220 and the correction performing unit 230 may access a corresponding database to query and receive data necessary for performing the event processing procedure according to an embodiment of the present invention when the event processing storage and event detection storage is implemented as a single database.

For example, the event analysis unit 220 may determine an event detected among the event source data received during a twenty-four hour period that has passed from a specific time as the event population 410 and the correction performing unit 230 may extract an event performing the required operation among the event population 410 as the event feedback group 430.

The correction performing unit 230 determines the ratio of the event feedback based on the number of the event population and the number of the event feedback group. The ratio of the event feedback group may correspond to a ratio of the number of the event feedback group and the number of the event population. For example, the ratio of the event feedback may correspond to a value of 100/400 (i.e., 0.25) when the number of the event population 410 (X) corresponds to a value of 400 and the number of the event feedback group 430 (A) corresponds to a value of 100.

The ratio of the event feedback represents an indicator describing a ratio of an event where the required operation is performed and the event detected by the event detection unit 210. As the ratio of the event feedback increases, a definition of the event will have been suitably defined.

In one embodiment, the correction performing unit 230 may extract the event claim group 440 in the non-event population 420. More particularly, the event claim group 440 includes an event performing a required operation by a user among the non-event population 420 associated with the event source data being not detected as the event by the event detection unit 210. That is, the correction performing unit 230 extracts the event claim group 440 associated with the required operation in the non-event population 420.

In one embodiment, the correction performing unit 230 may extract the event claim group 430 in event processing storage storing the event with the event source data identifier, and data indicating whether the event source data corresponds to the event and whether the required operation is performed.

For example, the event analysis unit 220 may determine the event source data being not detected as the event among the event source data received during a twenty-four time period from a specific time as the event non-event population 420 and the correction performing unit 230 may extract the event performing the required operation among the non-event population 420 as the event claim group 440.

The correction performing unit 230 determines the ratio of the event claim based on the number of the non-event population and the number of the event claim group. The ratio of the event claim corresponds to the ratio of the number of the event claim group and the non-event population. For example, the ratio of the event claim may correspond to a value of 50/500 (i.e., 0.1) when the number of the non-event population 420 (Y) corresponds to a value of 500 and the number of the event feedback group 440 (B) corresponds to a value of 50.

The ratio of the event claim represents an indicator describing a ratio of an event where the required operation is performed and the event source data being not detected as the event by the event detection unit 210. Accordingly, as the ratio of the event claim decreases, a definition of the event will have been suitably defined.

The control unit 240 controls operation and data flow of the event detection unit 210, the analysis unit 220 and the correction performing unit 230.

Operation and data flow of each of the components in the event processing apparatus 120 have been described. Now, with reference to FIGS. 5 through 8, an event processing procedure for each of the components will be described in detail.

Figure 5:
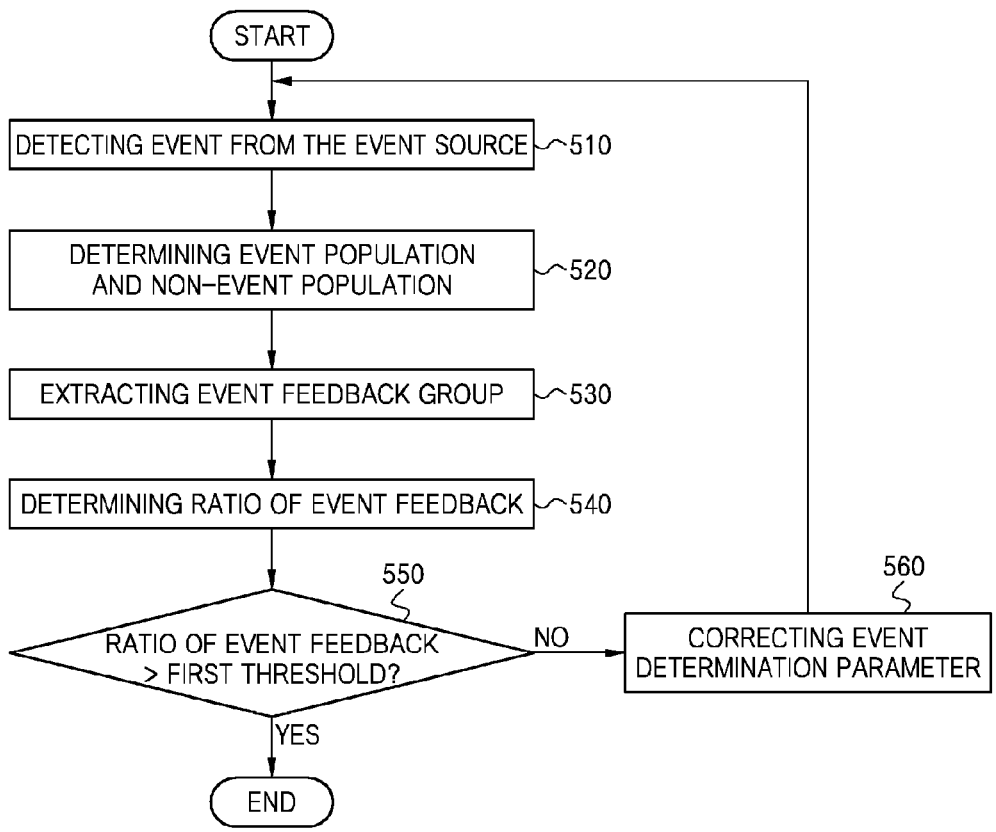
FIG. 5 is a flowchart illustrating an event processing procedure according to an example embodiment of the present invention.

FIG. 5 is a flowchart illustrating an event processing procedure according to an example embodiment of the present invention. The event detection unit 210 detects the event from the event source 110 (block S510). More particularly, the event detection unit 210 detects the predetermined event received from the event source 110 among the event source data.

In one embodiment, the event detection unit 210 may store the event with the event identifier and the event generation time when the event is detected. For example, the event detection unit 210 may generate data corresponding to ({10001, 2012.09.18.00:00}, {10002, 2012.09.18.00:02}, . . . ) to store the event as an event detection information.

In another embodiment, the event detection unit 210 may store the event with the event source data identifier, a received time and data indicating whether the event source data corresponds to the event. For example, the event detection unit 210 may generate data corresponding to ({10001, 2012.09.18.00: 00, event}, {10002, 2012.09.18.00:02, event}, {10003, 2012.09.18.00:04, non_event}, . . . ) to store the event as an event detection information.

In one embodiment, the event detection unit 210 may use the event detector to detect the event. For example, the event detection unit 210 may include a CEP (Complex Event Processing) engine.

The event analysis unit 220 determines the event population associated with an event detected by the event detection unit 210 and determines the non-event population 420 being not associated with an event detected by the event detection unit 210 and being disjoint from the event population 410 (block S520).

In one embodiment, the event population 410 is the event detected by the event detection unit 210 among the event source data. For example, the event analysis unit 220 may determine data (ID 10001, 10002, 10005, 10007, . . . ) determined as the event by the event detection unit 210 in the event source data received at two minute intervals as the event population.

In one embodiment, the non-event population 420 is the event source data being not detected as the event by the event detection unit 210 among the event source data. For example, the event analysis unit 220 may determine the event source data (ID 10003, 10004, 10006, . . . ) being not detected as the event by the event detection unit 210 among the event source data received at two minute intervals as the non-event population.

In one embodiment, the event analysis unit 220 may determine the event population and the non-event population based on the event source data received for a predetermined specific time. If desired, the specific time may be determined by the user. For example, the event analysis unit 220 may target the event source data during a twenty four hour time period after 00:00, Sep. 18, 2012 to determine the event detected by the event detection unit 210 as the event population.

The correction performing unit 230 extracts the event feedback group associated with the required operation in the event population (block S530). The required operation corresponds to a specific action predetermined by the user. That is, the event feedback group 430 corresponds to an event performing the required operation by the user among the event population 410 associated with the event detected by the event detection unit 210. For example, the user may cause the correction performing unit 230 to perform a specific action corresponding to operation of a cooling unit as a required operation to the corresponding event when specific event source data are detected as the event to be transmitted to a terminal associated with the user. That is, the required operation may represent a predetermined specific action suitable for performing monitoring the event source 110.

In one embodiment, the correction performing unit 230 may extract the event feedback group in the event processing storage storing the event with the event source data identifier, and data indicating whether the event source data correspond to the event and whether the required operation is performed.

The correction performing unit 230 determines the ratio of the event feedback based on the number of the event population and the number of the event feedback group (block S540). The ratio of the event feedback may correspond to a ratio of the number of the event feedback group and the number of the event population. For example, the ratio of the event feedback may be a value of 100/400 (i.e., 0.25) when the number of the event population 410 (X) is 400 and the number of the event feedback group 430 (A) is 100.

The ratio of the event feedback represents an indicator describing a ratio of an event where the required operation is performed and the event detected by the event detection unit 210. Accordingly, as the ratio of the event feedback increases, a definition of the event has been suitably defined.

In one embodiment, the correction performing unit 230 may check whether the ratio of the event feedback exceeds a predetermined first threshold (block S530). If desired, the first threshold may be determined by the user. The first threshold is generally a standard value about whether a definition of the event is suitably defined.

The definition of the event is suitably defined when the ratio of the event feedback exceeds the first threshold and the correction performing unit 230 terminates the event processing procedure without correcting the event determination parameter associated with the definition of the event.

The correction performing unit 230 may correct the event determination parameter determining a boundary between the event population 410 and the non-event population 420 when the ratio of the event feedback does not exceed the first threshold (Block S560). The event determination parameter is associated with the definition of the event and may be used for determining whether the event source data are detected as the event, and thus, the event determination parameter may be used for a criteria for determining a boundary between the event population 410 and the non-event population 420.

More particularly, although the event detection unit 210 detects the event based on the definition of the event, the ratio where the required operation is not performed by the user increases in cases where the ratio of the event feedback does not exceed the first threshold. This may indicate that the definition of the event is not suitably defined and the boundary between these items requires correction.

For example, the correction performing unit 230 may correct the event determination parameter when the first threshold is set as a value of 0.8 and the ratio of the event feedback corresponds to a value of 0.7. The event source 110 may include a temperature sensor and a humidity sensor. When the event is defined as, for example, the temperature exceeding 100 degrees and the humidity is greater than 80%, and the event determination parameter is implemented as data (t, 100, h, 80), the correction performing unit 230 may correct the event determination parameter as data (t, 110, h, 90).

The correction performing unit 230 may reset the boundary between the event population 410 and the non-event population 420 based on the corrected event determination parameter to cause the ratio of the event feedback to exceed the first threshold. More particularly, the correction performing unit 230 may repeat blocks S510 through S560 to cause the ratio of the event feedback to exceed the first threshold when the ratio of the event feedback does not exceed the first threshold. That is, the event detection unit 210 detects a new event from the event source 110 according to the corrected event determination parameter and the event analysis unit 220 determines the event population 410 and the non-event population 420. Herein, the correction performing unit 230 may determine the ratio of the event feedback to compare the determined ratio with the first threshold and may repeat the above procedures until a corresponding condition is satisfied.

Figure 6:
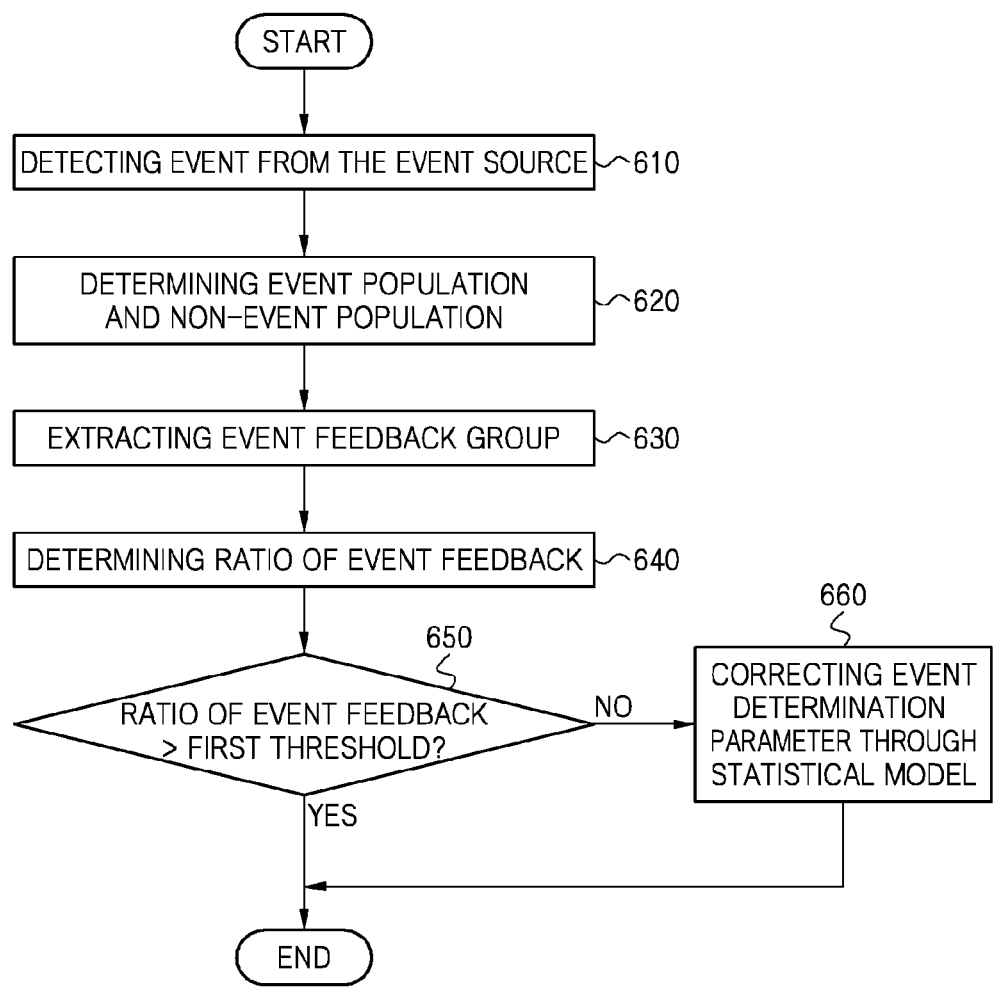
FIG. 6 is a flowchart illustrating of an event processing procedure according to other example embodiment of the present invention.

FIG. 6 is a flowchart illustrating an event processing procedure according to another example embodiment of the present invention. In FIG. 6, blocks S610 through S650 may be implemented in a manner that is substantially the same as with blocks S510 through S550. S660 differs from block S560 and will be described in more detail.

In one embodiment, the correction performing unit 230 may check whether the ratio of the event feedback exceeds the predetermined first threshold (block S560). The first threshold may be determined by the user. The first threshold is a standard value about whether the definition of the event is suitably defined.

The definition of the event is suitably defined when the ratio of the event feedback exceeds the first threshold and the correction performing unit 230 terminates the event processing procedure without correcting the event determination parameter associated with the definition of the event.

The correction performing unit 230 may correct the event determination parameter determining a boundary between the event population 410 and the non-event population 420 using a statistical model when the ratio of the event feedback does not exceed the first threshold (block S560).

More particularly, a repetition procedure of blocks S510 through S560 may be utilized for determining the event determination parameter satisfying the condition that the ratio of the event feedback exceeds the first threshold. This repetition procedure may be improved by using the statistical model. That is, when the definition of the event is defined as a plurality of event determination parameters, the correction performing unit 230 may use the statistical model to determine the plurality of event determination parameters causing the ratio of the event feedback to have a maximum value.

In one embodiment, the correction performing unit 230 may correct the event determination parameter through the statistical model adopting at least one of a neural network model, a genetic algorithm, or a machine learning algorithm. The correction performing unit 230 may verify the event determination parameter corrected through a verification algorithm. In one embodiment, the verification algorithm may be implemented using a Bayesian Information Criteria (BIC) algorithm. That is, the correction performing unit 230 may determine an event determination parameter where the ratio of the event feedback exceeds the first threshold and has a maximum value to correct the definition of the event through the statistical model.

Figure 7:
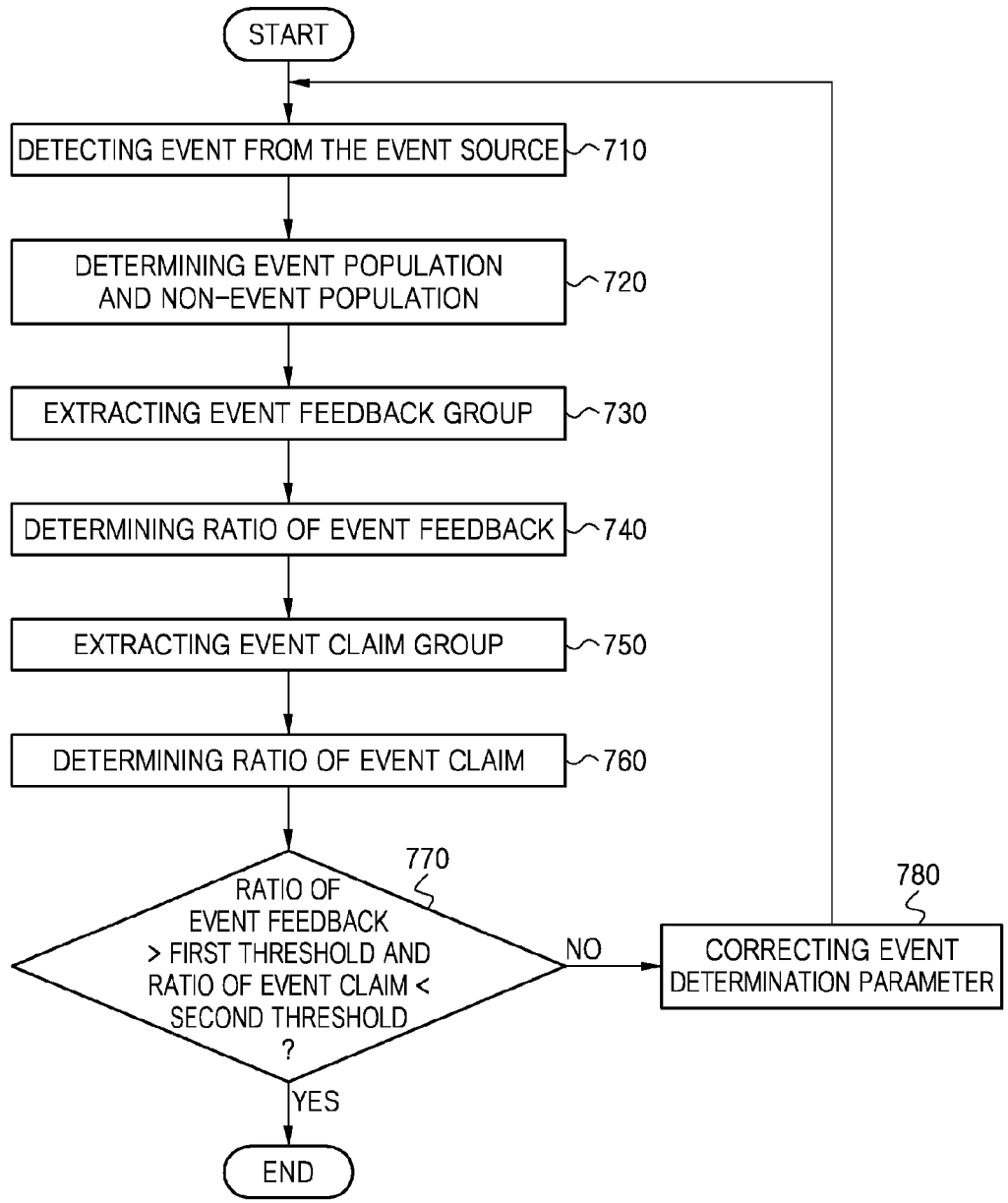
FIG. 7 is a flowchart illustrating an event processing procedure according to an example embodiment of the present invention.

FIG. 7 is a flowchart illustrating an event processing procedure according to an example embodiment of the present invention. The event detection unit 210 detects the event from the event source 110 (block S710). More particularly, the event detection unit 210 detects a predetermined event received from the event source 110 among the event source data.

In one embodiment, the event detection unit 210 may use the event detector to detect the event. For example, the event detector may correspond to the Complex Event Processing (CEP) engine.

The event analysis unit 220 determines the event population 410 associated with the event detected by the event detection unit 210 and determines the non-event population 420 as being not associated with the event detected by the event detection unit 210 and being disjoint from the event population 410 (block S720).

In one embodiment, the event population 410 may be an event detected by the event detection unit 210 among the event source data. For example, the event analysis unit 220 may determine data (ID 10001, 10002, 10005, 10007, . . . ) determined as the event by the event detection unit 210 in the event source data received at two minute interval as the event population 410.

In one embodiment, the non-event population may correspond to the event source data being not detected as the event by the event detection unit 210 in the event source data. For example, the event analysis unit 220 may determine the event source data (ID 10003, 10004, 10006, . . . ) being not detected as the event by the event detection unit 210 in the event source data received at two minute intervals as the non-event population.

The correction performing unit 230 extracts the event feedback group associated with the required operation in the event population (block S730). The required operation may be a specific action predetermined by the user. That is, the event feedback group 430 includes the event performing the required operation by the user among the event population 410 associated with the event detected by the event detection unit 210.

The correction performing unit 230 determines the ratio of the event feedback based on the number of the event population 410 the number of the event feedback group 430 (block S740). The ratio of the event feedback may be a ratio of the number of the event feedback group 430 and the number of the event population 410. For example, the ratio of the event feedback may correspond to 100/400 (i.e., 0.25) when the number of the event population 410 (X) corresponds to 400 and the number of the event feedback group 430 (A) corresponds to 100.

In one embodiment, the correction performing unit 230 may extract an event claim group 440 in the non-event population 420 (block S750). More particularly, the event claim group 440 may include an event performing the required operation by the user among the non-event population 420 associated with event source data being not detected as the event by the event detection unit 210. That is, the correction performing unit 230 extracts the event claim group 440 associated with the required operation in the non-event population 420.

In one embodiment, the correction performing unit 230 may extract the event claim group 440 in the event processing storage storing the event with the event source data identifier, whether the event source data corresponds to the event and whether the required operation is performed.

The correction performing unit 230 may determine the ratio of the event claim based on the number of the non-event population and the number of the event claim group (block S760). The ratio of the event claim may correspond to a ratio of the number of the event claim group and the number of the event non-population. For example, the ratio of the event claim is 50/500 (i.e., 0.1) when the number of the non-event population 420 (Y) is 500 and the number of the event feedback group 440 (B) is 50.

The ratio of the event claim represents an indicator describing a ratio of an event where the required operation is performed and the event source data being not detected as the event by the event detection unit 210. According as the ratio of the event claim decreases, a definition of the event have been suitably defined.

In one embodiment, the correction performing unit 230 may check whether the ratio of the event feedback exceeds the predetermined first threshold (block S770). The first threshold may be determined by the user. The first threshold corresponds to the standard value about whether the definition of the event is suitably defined.

The definition of the event is suitably defined when the ratio of the event feedback exceeds the first threshold and the correction performing unit 230 terminates the event processing procedure without correcting the event determination parameter associated with the definition of the event.

In one embodiment, the correction performing unit 230 may check whether the ratio of the event claim is less than the predetermined second threshold (block S770). The second threshold may be determined by the user. The second threshold may correspond to a standard value about whether the definition of the event is suitably defined.

The definition of the event is suitably defined when the ratio of the event claim is less than the second threshold and the correction performing unit 230 terminates the event processing procedure without correcting the event determination parameter associated with the definition of the event.

That is, the first threshold is associated with the ratio of the event feedback and the second threshold is associated with the ratio of the event claim. Herein, according as the first threshold is higher and the second threshold is lower, the user has more frequently detected the event where the required operation among the event source data is performed.

The correction performing unit 230 may correct the event determination parameter determining a boundary between the event population 410 and the non-event population 420 when the ratio of the event feedback does not exceed the first threshold and the ratio of the event claim is not less than the second threshold (block S780).

The correction performing unit 230 may reset the boundary between the event population 410 and the non-event population 420 based on the corrected event determination parameter to cause the ratio of the event feedback to exceed the first threshold and the ratio of the event claim to be less than the second threshold.

More particularly, the correction performing unit 230 may repeat blocks S710 through S770 to cause the ratio of the event feedback to exceed the first threshold and the ratio of the event claim to be less than the second threshold when the ratio of the event feedback does not exceed first threshold and the ratio of the event claim is not less than the second threshold. That is, the correction performing unit 230 may determine the ratio of the event feedback and the ratio of the claim to respectively compare the determined ratio with the first threshold and the second threshold and may repeat the above procedures until a corresponding condition is satisfied.

Figure 8:
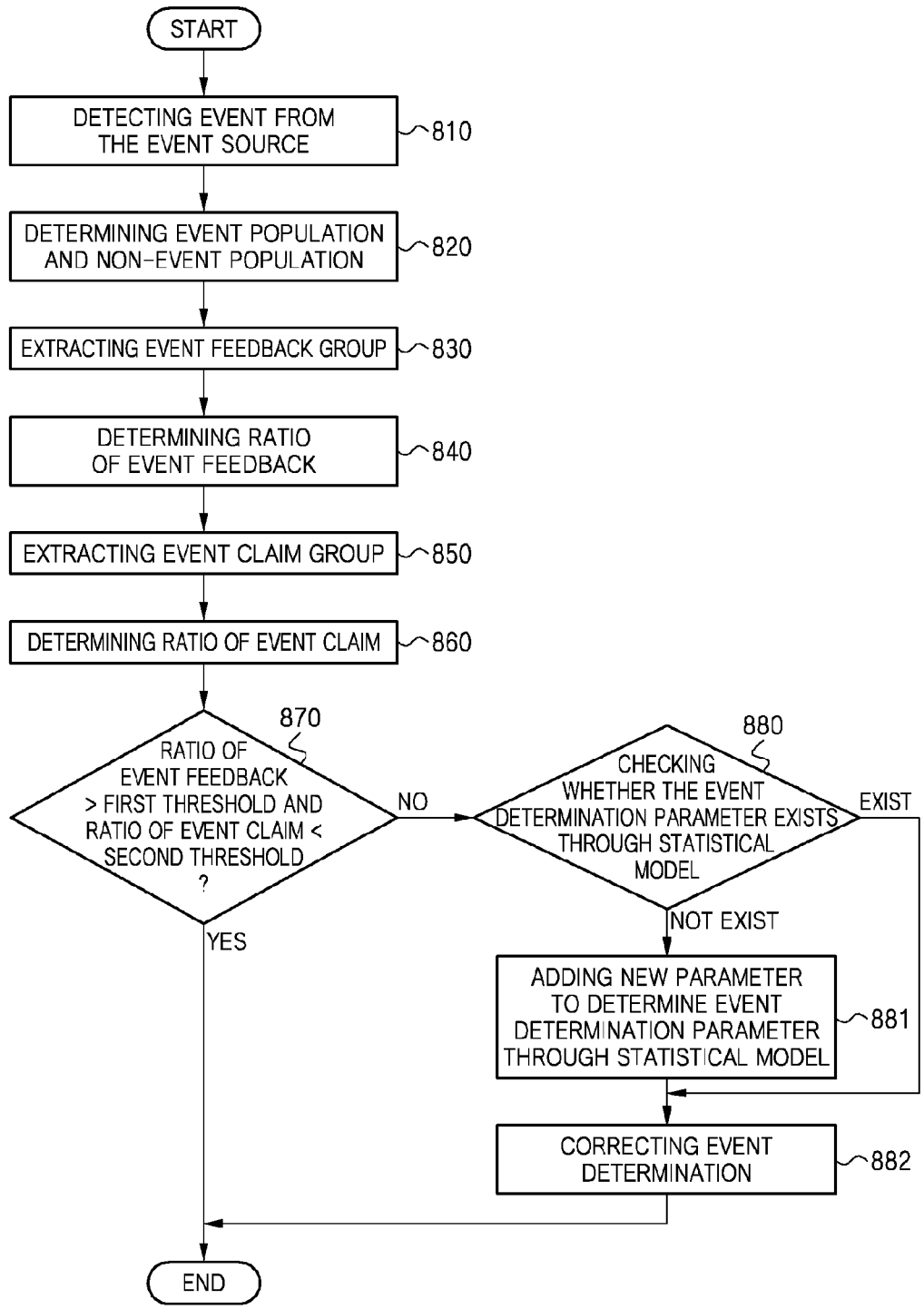
FIG. 8 is a flowchart illustrating an event processing procedure according to other example embodiment of the present invention.

FIG. 8 is a flowchart illustrating an event processing procedure according to another example embodiment of the present invention. In FIG. 8, blocks S810 through S870 depict features that are generally the same as those of blocks S710 through S770. Block S880 differs from other embodiments and will now be described in detail.

In one embodiment, the correction performing unit 230 may check whether the ratio of the event feedback exceeds the first threshold and the ratio of the event claim is less than the second threshold (block S870).

The correction performing unit 230 may correct the event determination parameter determining a boundary between the event population 410 and the non-event population 420 through the statistical model when the ratio of the event feedback does not exceed the first threshold and the ratio of the event claim is not less than the second threshold. More particularly, a repetition procedure of blocks S810 through S870 may be used to determine the event determination parameter satisfying the condition that the ratio of the event feedback exceeds the first threshold and the ratio of the event claim is less than the second threshold. The repetition procedure may be improved by using the statistical model. When the definition of the event is defined as a plurality of event determination parameters, the correction performing unit 230 may use the statistical model to determine the plurality of event determination parameters causing the ratio of the event feedback to have a maximum value and the ratio of the event claim to have a minimum value.

In one embodiment, the correction performing unit 230 may correct the event determination parameter through the statistical model adopting at least one of a neural network model, a genetic algorithm and a machine learning algorithm.

The correction performing unit 230 may verify the event determination parameter corrected through a verification algorithm. In one embodiment, the verification algorithm may include to Bayesian Information Criteria (BIC) algorithm.

In more detail, the correction performing unit 230 may check whether the event determination parameter satisfying the condition exists through the statistical model (block S880). For example, the event determination parameter satisfying the condition may not exist when the event is defined through a plurality of the event determination parameter.

The correction performing unit 230 corrects the event determination parameter when the event determination parameter satisfying the condition exists (block S882). When event determination parameters satisfying the condition are plural, the correction performing unit 230 may correct the event determination parameter as an event determination parameter where the ratio of the event feedback has a maximum value or the ratio of the claim has a minimum value.

The correction performing unit 230 may add a new parameter in the event determination parameter to correct the event determination parameter when a new event determination parameter satisfying the condition does not exist. (block S881). The new parameter may include a parameter defined by another event source different from event source 110 in the predetermined event.

For example, assuming that the event is defined as, for example, the temperature is greater than 100 degrees and the humidity is greater than 80%, and the event determination parameter corresponds to data {t}, {100}, {h} and {80}, the correction performing unit 230 may add a new parameter {V} and {100} corresponding to [instant voltage is 100 volt] associated with a voltage sensor indicating another event source to determine an event determination parameter satisfying a corresponding condition when the correction performing unit 230 checks that the new event determination parameter satisfying the condition does not exist through the statistical model.

That is, the correction performing unit 230 may add the new parameter performing the required operation to determine the event determination parameter through the statistical model.

Provided here are descriptions of preferred embodiments of the present invention, it would be understood by those skilled in the art that the present invention can be modified or changed in various ways without departing from the technical principles and scope defined by the appended claims.

DESCRIPTION OF SYMBOLS

110: Event Source
120: Event Processing Apparatus
210: Event Detection Unit
220: Event Analysis Unit
230: Correction Performing Unit
240: Control Unit
410: Event Population
420: Non-Event Population
430: Event Feedback Group
440: Event Claim Group

What is claimed is:

1. An event processing method, comprising:
    detecting, at a computing device, at least one event from event sources received, wherein the event is detected based on at least one event determining parameter;
    identifying, at the computing device, an event population and non-event population based on the detected event, wherein the event population includes the event and the non-event population includes the event sources except for the event;
    identifying, at the computing device, an event feedback group from the event of the event population, wherein the event feedback group includes at least one event of the event population that have performed a required operation;
    determining, at the computing device, a ratio of event feedback, the ratio of the event feedback being a ratio of a number of events of the event feedback group to a number of events of the event population; and
    checking, at the computing device, whether the ratio of the event feedback exceeds a first threshold for determining a suitability of the event.

2. The event processing method of claim 1, wherein the required operation corresponds to a specific action predetermined by a user.

3. The event processing method of claim 1, further comprising:
    changing the event determination parameter defining a boundary between the event population and the non-event population when the ratio of the event feedback does not exceed the first threshold.

4. The event processing method of claim 3, wherein the event determination parameter includes a parameter defined by the event source.

5. The event processing method of claim 1, further comprising:
    identifying, at a computing device, an event claim group from the non-event population, wherein the event claim group includes at least one event of the non-event population that have performed the required operation; and
    determining, at the computing device, a ratio of an event claim, the ratio of the event claim being a ratio of a number of events of the event claim group to a number of the event sources of the non-event population.

6. The event processing method of claim 5, further comprising:
    checking whether the ratio of the event claim is less than a second threshold.

7. The event processing method of claim 6, further comprising:
    correcting an event determination parameter determining a boundary between the event population and the non-event population when the ratio of the event feedback does not exceed the first threshold or the ratio of the event claim is not less than the second threshold.

8. The event processing method of claim 7, wherein the event determination parameter includes a second parameter, the method further comprising:
    changing the second parameter of the event determination parameter when an event determination parameter causing the ratio of the event feedback to exceeds the first threshold and the ratio of the event claim to be less than the second threshold does not exist.

9. The event processing method of claim 8, wherein the second parameter includes a parameter defined by another event source and the event source.

10. An apparatus for processing events, the apparatus comprising:
    a computing device configured to:
        detect at least one event from event sources received, wherein the event is detected based on at least one event determining parameter;
        identify an event population and non-event population based on the detected event, wherein the event population includes the event and the non-event population includes the event sources except for the event;
        identify an event feedback group from the event of the event population, wherein the event feedback group includes at least one event of the event population that have performed a required operation;
        determine a ratio of event feedback, the ratio of the event feedback being a ratio of a number of events of the event feedback group to a number of the events of the event population; and
        check whether the ratio of the event feedback exceeds a first threshold.

11. The apparatus of claim 10, wherein the required operation corresponds to a specific action predetermined by a user.

12. The apparatus of claim 10, wherein the computing device is further configured to:
    change an event determination parameter defining a boundary between the event population and the non-event population when the ratio of the event feedback does not exceed the first threshold.

13. The apparatus of claim 12, wherein the event determination parameter includes a parameter defined by the event source.

14. The apparatus of claim 10, wherein the computing device is further configured to:
    identify an event claim group from the non-event population, wherein the event claim group includes at least one event of the non-event population that have performed the required operation; and
    determine a ratio of an event claim, the ratio of the event claim being a ratio of a number of events of the event claim group to a number of the events of the identified non-event population.

15. The apparatus of claim 14, wherein the computing device is further configured to:
    check whether the ratio of the event claim is less than a second threshold.

16. The apparatus of claim 15, wherein the computing device is further configured to:
    correct an event determination parameter determining a boundary between the event population and the non-event population when the ratio of the event feedback does not exceed the first threshold or the ratio of the event claim is not less than the second threshold.

17. The apparatus of claim 16, wherein the event determination parameter includes a second parameter, and wherein the computing device is further configured to:

change the second parameter of the event determination parameter when an event determination parameter causing the ratio of the event feedback to exceed the first threshold and the ratio of the event claim to be less than the second threshold does not exist.

18. The apparatus of claim 17, wherein the second parameter includes a parameter defined by another event source and the event source.

\* \* \* \* \*